United States Patent [19]
Schaeffler

[11] 3,797,897
[45] Mar. 19, 1974

[54] ROLLER BEARING

[75] Inventor: Georg Schaeffler, Herzogenaurach, Germany

[73] Assignee: Industriewerk Schaeffler, Herzogenaurach, Germany

[22] Filed: Dec. 29, 1972

[21] Appl. No.: 319,496

[30] Foreign Application Priority Data
Jan. 18, 1972 Germany............................ 2202085

[52] U.S. Cl.............................................. 308/6 C
[51] Int. Cl. ........................................... F16c 29/06
[58] Field of Search............ 308/6 C, 6 R, 184, 216

[56] References Cited
UNITED STATES PATENTS
3,341,262  9/1967  Kalmanek........................... 308/6 C
2,947,581  8/1960  Van Dorn et al................... 308/216
3,588,205  6/1971  Daugherty........................ 308/184 R
3,608,985  9/1971  Swanson............................ 308/6 C FOREIGN PATENTS OR APPLICATIONS
1,575,658  1/1970  Germany.............................. 308/6

Primary Examiner—Manuel A. Antonakas
Assistant Examiner—Barry Grossman
Attorney, Agent, or Firm—Hammond & Littell

[57] ABSTRACT

Novel roller bearing for the longitudinally moveable mounting of parts wherein rollers of the bearing move into and out of a slot or space between two races arranged parallel to each other.

4 Claims, 3 Drawing Figures

PATENTED MAR 19 1974    3,797,897

ROLLER BEARING

STATE OF THE ART

Roller bearings of this type are known in a wide variety of designs as level drives or as roller bearings wherein the rollers rotate in a continuous closed raceway wherein long linear movement routes with the least possible friction are required.

This type of roller bearing which has found particular use for the longitudinally moveable mounting of tool tables for heavy duty machine tools such as grinding machines and the like consist of a housing which has a straight load carrying race section, a parallel straight return race section and two semi-cylindrical race sections connecting the said races. In such a bearing for mounting a part to be moved with respect to the housing, the rollers run into the load bearing straight race section or run out of it so that Z or Z+1 rollers are within the supporting zone depending upon the division of the rollers. This causes a tool table, for example, mounted longitudinally moveable by the roller bearing to be periodically raised and lowered during the operating movement. The magnitude of the change in height results from the difference of the spring characteristics of Z and Z+1 rollers and will vary slightly upon the load and number of rollers. It causes an undesirable disturbance particularly in precision work such as grinding or polishing.

OBJECTS OF THE INVENTION

It is an object of the invention to provide novel roller bearings for longitudinally moveable mounting of elements with optimum space requirements and load capacity and equal rigidity under high bearing load.

This and other objects and advantages of the invention will become obvious from the following detailed description.

THE INVENTION

The novel roller bearing of the invention for the longitudinally moveable mounting of two elements comprises a plurality of rollers entering and exiting a slot or space between two parallel races, longitudinally wedge-shaped shallow recesses at the entrance and exit area of the slot and having an area approximately equal to one roller spacing. By one roller spacing is meant the distance between the axis of two adjacent rollers. In one embodiment of the bearing, two parallel races connected together by two semi-cylindrical race sections, a plurality of rollers rolling on said races, one of said parallel races being provided with a slot or space wherein said rollers are under load, shallow recesses being provided at the entrance and exit zone of the slot, said recesses being longitudinally wedge-shaped and approximately the area of a single roller spacing.

This construction has the advantage that the number of rollers in the load bearing section of the race and under full load is the same at all times while the useable load bearing length of the rollers in the entrance and exit zones of the load section increases or decreases from almost zero to full load. Therefore, the total load bearing length of all rollers in the load zone and hence the elastic deformation of rollers and race is always constant whereby changes in the level of the height of the carriage are avoided.

In another modification of the invention, the ends of the wedge-shaped recesses face each other and it is particularly preferred to have the maximum width of the recesses slightly less than the length of the rollers. This arrangement is particularly beneficial because the rollers coming from the return race could be moving at an oblique angle with respect to the race as they enter the load bearing zone of the race and they are therefore straightened.

In a further embodiment of the invention, the ends of the rollers are coordinated with guide means protruding beyond the race in the entrance and exit areas by at least one-half the roller diameter which permits axis-parallel guidance of the roller ends before making contact with the load bearing race section. This avoids, with certainty, tilting of the rollers.

Referring now to the drawings.

Figure 1:
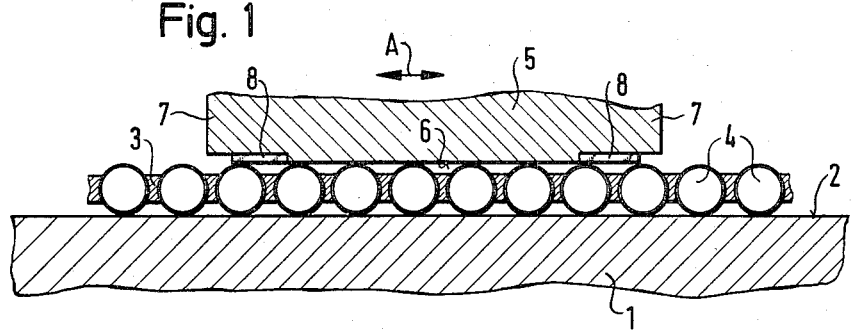
FIG. 1 is a partial cross-sectional view of one embodiment of the roller bearing of the invention for longitudinal movement.

In the embodiment illustrated in FIG. 1, the roller bearing for longitudinal movement is comprised of a base 1 forming one straight race 2 for cylindrical rollers 4 retained in flat cage 3 and upper element 5 longitudinally moveable with race 6 parallel to race 2. In the area of end faces 7 of element 5 where the rollers 4 enter and leave race 6 when element 5 moves in the directions of arrows A, element 5 is provided at either end with a shallow recess 8, longitudinally wedge-shaped and covering the area of a roller spacing.

Figure 2:
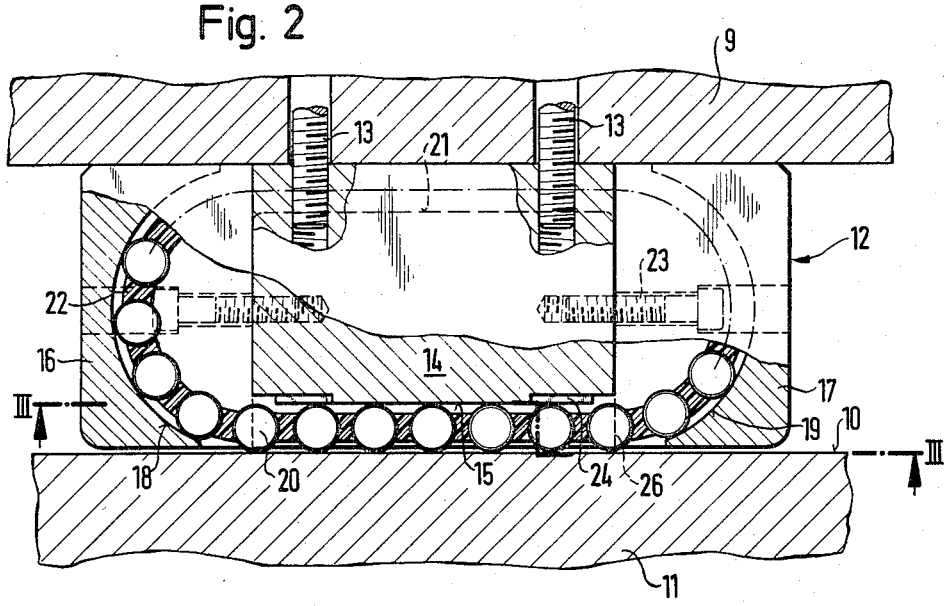
FIG. 2 is a partial cross-sectional view of another bearing of the invention.
Figure 3:
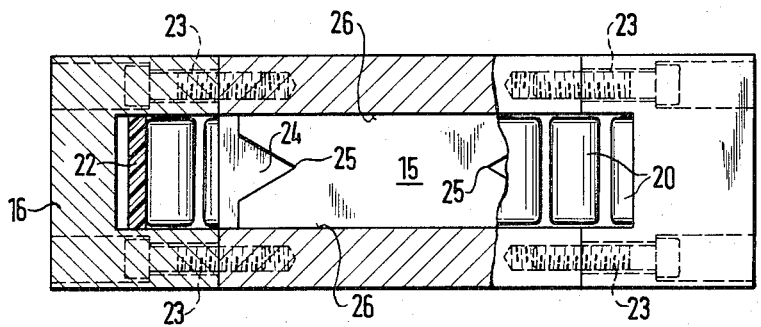
FIG. 3 is a cross-sectional view of the embodiment of FIG. 2 along the line III—III.

In the embodiments of FIGS. 2 and 3, element 9 which may be a longitudinally moveable table is mounted on element 11 provided with a race 10 by roller bearing rigidly secured to element 9 by screws 13. The roller bearing 12 is comprised of a bearing body or housing 14 with straight race section 15 under load and straight return race section 21 not under load connected at their ends by lateral parts 16 and 17 which contain semi-cylindrical race sections 18 and 19, respectively. Rollers 20 are secured from dropping out of the bearing by an elastic cage 22 which may be made of a suitable material such as plastic. Screws 23 secure the lateral parts 16 and 17 to bearing body 14.

In the entrance and exit areas of the load bearing race section 15, shallow recesses 24 which are longitudinally wedge-shaped and are provided with points 25 facing each other are provided so that each recess 24 covers longitudinally approximately the space of a single roller. The maximum width of the recess is slightly less than the length of roller 20. FIG. 2 illustrates particularly well guide strips 26 protruding beyond the race into the entrance and exit area of load bearing race section 15 by at least one half a roller diameter. The strips 26 cooperate with the ends of rollers 20 in the area of straight race section 15 to guide them in an axis-parallel direction.

Various modifications of the bearing of the invention may be made without departing from the spirit or scope thereof and it should be understood that the invention is to be limited only as defined in the appended claims.

I claim:

1. A roller bearing for the longitudinally moveable mounting of two elements comprising two longitudinally moveable elements having a space therebetween and a race on each of their confronting surfaces, a plurality of rollers entering and exiting in said space and one of said elements being provided in the entrance and exit zones with wedge-shaped shallow recesses in the race of the element to provide elastic equalization zones at the entrance and exit zones, said recesses having an area approximately equal to one roller spacing.

2. A roller bearing of claim 1 wherein the recesses are provided with points facing each other.

3. A roller bearing of claim 1 wherein the maximum width of the recesses is slightly less than the length of the rollers.

4. A roller bearing of claim 1 wherein the entrance and exit area of race section is provided with guide strips protruding beyond the race by at least one half a roller diameter which cooperate with the roller ends to provide axial alignment thereof.

* * * * *